US006887924B2

(12) United States Patent
McKedy et al.

(10) Patent No.: US 6,887,924 B2
(45) Date of Patent: May 3, 2005

(54) PRESSED ADSORBENT AND METHOD OF FABRICATION THEREOF

(75) Inventors: George E. McKedy, Williamsville, NY (US); Louis Patrone, Hamburg, NY (US); Thomas H. Powers, Mayville, NY (US); Paul A. Riemenschneider, Williamsville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 357 days.

(21) Appl. No.: 09/853,199

(22) Filed: May 11, 2001

(65) Prior Publication Data

US 2002/0188046 A1 Dec. 12, 2002

(51) Int. Cl.[7] .............................. B01J 20/28; L08K 5/00

(52) U.S. Cl. ........................... 524/80; 524/81; 524/399; 524/401; 524/1

(58) Field of Search ................................ 524/1, 80, 81, 524/399, 401

(56) References Cited

U.S. PATENT DOCUMENTS 4,061,807 A 12/1977 Shaler et al.
4,067,847 A * 1/1978 Yui et al. ............... 260/45.7 R
4,740,538 A * 4/1988 Sekutowski ................. 523/205
5,432,214 A 7/1995 Lancesseur

FOREIGN PATENT DOCUMENTS

EP 400460 12/1990
EP 432438 6/1991
WO WO/97/32663 9/1997

* cited by examiner

*Primary Examiner*—Peter D. Mulcahy
(74) *Attorney, Agent, or Firm*—Stephen B. Salai, Esq.; Brian B. Shaw, Esq.; Harter, Secrest & Emery LLP

(57) ABSTRACT

An adsorbent form consisting of a pressed blend of powdered adsorbent and powdered resin. A method of fabricating a pressed adsorbent form consisting of the steps of forming a blend of powdered adsorbent and powdered resin, and compressing said blend to form a self-sustaining form.

33 Claims, No Drawings

PRESSED ADSORBENT AND METHOD OF FABRICATION THEREOF

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an adsorbent which may be pressed into various forms.

By way of background, in the past, various types of adsorbents have been combined with various types of resins by heating and molding to produce various self-sustaining forms for effecting an adsorbent function. In addition, in the past, adsorbents were combined with resins and elastomers by extrusion, as shown in U.S. Pat. No. 5,432,214, to produce a formed adsorbent. However, insofar as known, there were no resin bonded adsorbent forms which consisted essentially only of the resin and the adsorbent which were formed by a cold pressing process.

BRIEF SUMMARY OF THE INVENTION

It is an object of the present invention to provide a self-sustaining adsorbent form containing essentially only an adsorbent and a binder which can be fabricated by a simple pressing operation without the application of external heat.

The present invention relates to an adsorbent form consisting essentially of a pressed blend of powdered adsorbent and powdered resin.

The present invention also relates to a method of fabricating a pressed adsorbent form consisting essentially of the steps of forming a blend of powdered adsorbent and powdered resin, and compressing said blend to form a self-sustaining form.

The various aspects of the present invention will be more fully understood when the following portions of the specification are read in conjunction with the accompanying drawings wherein:

DETAILED DESCRIPTION OF THE INVENTION

The resin bonded adsorbent of the present invention is fabricated by a simplified process requiring essentially only a resin and the adsorbent which are combined to create various forms by simple pressing without the addition of external heat during the pressing process. It is believed that the foregoing is possible because of the sizes of the powdered resin and powdered adsorbent and the low melting point of the resin. The various forms may include a variety of shapes, sizes and absorbent material blends to create specific configurations for custom applications. The various forms can be as pressed tablet shapes or pressed shapes that can be custom shaped as part of a post processing step, such as die cutting, grinding or machining. The various forms may include, without limitation, rectangular and cylindrical solids, hollow cylinders, pill shapes, and custom molded shapes. Thinner parts manufactured with this method retain flexibility that allow them to conform as part of a three-dimension assembly. This bonded adsorbent part can be utilized to absorb/adsorb a variety of gaseous materials, such as water vapor, hydrocarbons, acid gases, oxygen, etc. The pressing process may include simple pressing, ejection molding and extrusion.

In accordance with the present invention, a tablet was manufactured by a simple pressing process containing by weight the following composition:

| | |
|---|---|
| 18.0% | low density polyethylene |
| 81.0% | silica gel |
| 1.0% | aluminum stearate |

In preparing the tablet, the powdered polyethylene which was used was of a very fine variety having a size of 20 microns and a low softening point of 97° C. The foregoing polyethylene is available under the trademark EQUISTAR FN 510-00 which is a product of the Equistar Chemical Co. The powdered silica gel had a size of approximately 300 microns. The aluminum stearate was an inert material used as a lubricant for press release.

The above polyethylene, silica gel and aluminum stearate components were mixed in a high shear mixer for approximately five minutes. Thereafter, 0.4 grams of the mixture were pressed in a tablet press under a pressure of 18,600 pounds per square inch for approximately 0.05 minutes. There was no external heat applied to the mixture either before or during the pressing. Considering that the polyethylene has a relatively low softening point, when the pressure is applied to the mixture of the powdered silica gel and powdered polyethylene, the pressure causes the polyethylene to soften and flow to bond the silica gel particles together. This allows the pressed form to have strength without heating so that it can be handled and worked with immediately after it has been removed from the press. The very fine size low softening point polyethylene provides good bond strength utilizing only pressure without heat. At a later time the pressed form was heated to approximately 140° C. for approximately two hours to activate the adsorbent and soften the polyethylene so that the latter will flow and further increase the bond strength.

It is believed that the mechanics of the pressing action is that by the use of very fine and low softening point polyethylene, good bond strength will be obtained with only pressure and without external heat. It is further believed that the heat generated by the pressing action causes the powdered polyethylene to soften and flow between the particles of silica gel and agglomerate to form a porous matrix. When the pressure is released, the composition cools, and after the polyethylene hardens, the formed matrix gives the pressed part strength to permit it to stay together. The foregoing action results in a porous formed part which will adsorb moisture.

While the above noted powdered polyethylene of approximately 20 micron size has been found to be best, other powdered polyethylenes have been used with adequate results but not as good as was found with the 20 micron size polyethylene. In this regard tests were made using the following resins and silica gel. A medium density powdered polyethylene having a size of 500 microns known under the trademark PE NVA TR 0535 of Ashland Chemical Company was used in substantially the same proportions as noted above. Also, low density polyethylene having a size of 300 microns and known under the trademark EQUISTAR 722-00 was used in the same proportions as noted above. Additionally, high density polyethylene having a size of 20 microns and known under the trademark EQUISTAR FA 700-00 was used in the same proportions noted above with silica gel. Also, powdered ethylene having a size of 500 microns and known under the trademark EQUISTAR MU 736-00 was also used in the same proportions as noted above.

A table showing the relative crush strengths in pounds of currently commercially produced tablets and the above-described tablet of 18% polyethylene and 81% silica gel which was formulated in the above manner is set forth below. The compared tablets were substantially rectangular in form having a length of about 0.819 inches, a width of about 0.417 inches and a height of about 0.207 inches.

TABLE

| | Crush Strength (lbs.) | |
|---|---|---|
| | Current Commercially Produced Tablets | Polyethylene Bonded Tablets |
| | 7.59 | 21.45 |
| | 6.27 | 17.49 |
| | 6.82 | 18.26 |
| | 7.59 | 18.37 |
| | 6.05 | 20.24 |
| | 8.14 | 20.35 |
| | 5.50 | 21.56 |
| | 7.14 | 21.34 |
| | 7.81 | 20.35 |
| | 4.07 | 18.70 |
| AVERAGE | 6.70 | 19.81 |

In the above table the current commercially produced tablets had a composition of silica gel and polyvinylpyrrolidone (PVP) as the binder and they were fabricated by pressing. The crush strength was determined by the use of a three point break test applied perpendicular to the 0.417X.819 surfaces.

As noted above, various types of powdered polyethylene including low density, medium density and high density polyethylenes, polypropylenes and plain ethylene were used. It is also believed that other resins including but not limited to polypropylenes, polystyrenes, polyamides, polyvinyl chlorides and hydrocarbon polymers may be utilized in addition to those discussed above in a process wherein essentially only resin is mixed with the absorbent and pressed without heat to form a desired shape.

While the preferred composition listed above utilized a polyethylene particle size of 20 microns, it is believed that the polyethylene size range may be between 5.0 microns and 1000 microns and more preferably between 10 microns and 500 microns and most preferably between 20 microns and 100 microns. The same micron range can be used for the other resins listed above.

While the above discussed only silica gel as part of the composition, various other adsorbents including but not limited to molecular sieve, activated carbon, calcium oxide, potassium carbonate, sodium chloride, and absorbents such as oxygen-absorbing materials, ethylene-absorbing materials and humectants may be used with the powdered polyethylene or other resins noted above, and mixtures may be used in approximately the same size ranges and same proportions as for the powdered polyethylene.

While the preferred composition listed above utilized silica gel having a particle size of approximately 300 microns, it is believed that the particle size may range between 10 microns and 5,000 microns and more preferably between 50 microns and 1,000 microns and most preferably between 100 microns and 500 microns. The same micron range can be used for the other adsorbents and absorbents listed above.

In addition to the foregoing, while the preferred example listed above disclosed the use by weight of 81% silica gel and 18% powdered polyethylene, it is believed that the composition may include by weight between 10% and 95% silica gel and more preferably between 65% and 90% silica gel and most preferably between 75% and 85% silica gel. The remainder of the composition will be the resin.

The forms may be compressed at a pound per square inch pressure of between 3,000 and 50,000, and more preferably between 5,000 and 40,000, and most preferably between 9,000 and 20,000. The actual pressure which is used will depend on the physical characteristics of the resin and the adsorbent.

As noted above, the pressed form can be heated to activate the adsorbent and soften the resin, in that instance the polyethylene. Accordingly, the pressed form may be subsequently heated between 50° C. and 300° C., and more preferably between 110° C. and 170° C., and most preferably between 130° C. and 150° C. for the polyethylene. However, other ranges could be applicable to the other resins listed above. The temperature which is selected should be between the resin softening point and its decomposition temperature. It is to be noted that when high proportions of resin binder are used, when the binder is effectively melted during the heating step, it will flow to the surface of the form to give it a dust-free coating. The time for applying the heat can be between fifteen minutes and eight hours or for any other time period required to soften the resin and increase the bond strength.

While preferred embodiments of the present invention have been disclosed, it will be understood that it is not limited thereto but may be otherwise embodied within the scope of the following claims.

What is claimed is:

1. A method of fabricating a pressed adsorbent form consisting essentially of the steps of forming a blend of powdered adsorbent and powdered resin, and compressing said blend to form a self-sustaining form, wherein said blend is compressed at a pressure of between about 3,000 pounds per square inch and 50,000 pounds per square inch and said self-sustaining form is subsequently heated to between about 50° C. and 300° C. to activate and soften said resin.

2. The method of fabricating a pressed adsorbent form as set forth in claim 1 wherein said powdered adsorbent is of a size of between about 10 microns and 5,000 microns, and wherein said powdered resin is of a size of between about 5 microns and 1,000 microns.

3. The method of fabricating a pressed adsorbent form as set forth in claim 2 wherein said powdered adsorbent is present by weight in an amount of between about 10% and 95%.

4. The method of fabricating a pressed adsorbent form as set forth in claim 2 wherein said powdered adsorbent is present by weight in an amount of between about 65% and 90%.

5. The method of fabricating a pressed adsorbent form as set forth in claim 2 wherein said powdered adsorbent is present by weight in an amount of between about 75% and 85%.

6. The method of fabricating a pressed adsorbent form as set forth in claim 1 wherein said powdered adsorbent is of a size of between about 50 microns and 1,000 microns, and wherein said powdered resin is of a size of between about 10 microns and 500 microns.

7. The method of fabricating a pressed adsorbent form as set forth in claim 6 wherein said powdered adsorbent is present by weight in an amount of between about 10% and 95%.

8. The method of fabricating a pressed adsorbent form as set forth in claim 6 wherein said powdered adsorbent is present by weight in an amount of between about 65% and 90%.

9. The method of fabricating a pressed adsorbent form as set forth in claim 6 wherein said powdered adsorbent is present by weight in an amount of between about 75% and 85%.

10. The method of fabricating a pressed adsorbent form as set forth in claim 1 wherein said powdered adsorbent is of a size of between about 100 microns and 500 microns, and wherein said powdered resin is of a size of between about 20 microns and 100 microns.

11. The method of fabricating a pressed adsorbent form as set forth in claim 10 wherein said powdered adsorbent is present by weight in an amount of between about 10% and 95%.

12. The method of fabricating a pressed adsorbent form as set forth in claim 10 wherein said powdered adsorbent is present by weight in an amount of between about 65% and 90%.

13. The method of fabricating a pressed adsorbent form as set forth in claim 10 wherein said powdered adsorbent is present by weight in an amount of between about 75% and 85%.

14. The method of fabricating a pressed adsorbent form as set forth in claim 1 wherein said self-sustaining form is subsequently heated to between about 110° C. and 170° C. to activate said adsorbent and soften said resin.

15. The method of fabricating a pressed adsorbent form as set forth in claim 1 wherein said self-sustaining form is subsequently heated to between about 130° C. and 150° C. to activate said adsorbent and soften said resin.

16. The method of fabricating a pressed adsorbent form as set forth in claim 1 wherein said blend is compressed at a pressure of between about 5,000 pounds per square inch and 40,000 pounds per square inch.

17. The method of fabricating a pressed adsorbent form as set forth in claim 16 wherein said self-sustaining form is subsequently heated to between about 110° C. and 170° C. to activate said adsorbent and soften said resin.

18. The method of fabricating a pressed adsorbent form as set forth in claim 16 wherein said self-sustaining form is subsequently heated to between about 130° C. and 150° C. to activate said adsorbent and soften said resin.

19. The method of fabricating a pressed adsorbent form as set forth in claim 1 wherein said blend is compressed at a pressure of between about 9,000 pounds per square inch and 20,000 pounds per square inch.

20. The method of fabricating a pressed adsorbent form as set forth in claim 19 wherein said self-sustaining form is subsequently heated to between about 110° C. and 170° C. to activate said adsorbent and soften said resin.

21. The method of fabricating a pressed adsorbent form as set forth in claim 19 wherein said self-sustaining form is subsequently heated to between about 130° C. and 150° C. to activate said adsorbent and soften said resin.

22. The method of fabricating a pressed adsorbent form as set forth in claim 1 wherein said powdered adsorbent is of a size of between about 10 microns and 5,000 microns, and wherein said powdered resin is of a size of between about 5 microns and 1,000 microns, and wherein said blend is compressed at a pressure of between about 3,000 pounds per square inch and 50,000 pounds per square inch.

23. The method of fabricating a pressed adsorbent form as set forth in claim 22 wherein said powdered adsorbent is present by weight in an amount of between about 65% and 90%.

24. The method of fabricating a pressed adsorbent form as set forth is claim 23 wherein said self-sustaining form is subsequently heated to between about 110° C. and 170° C. to activate said adsorbent and soften said resin.

25. The method of fabricating a pressed adsorbent form as set forth in claim 23 wherein said self-sustaining form is subsequently heated to between about 130°C. and 150° C. to activate said adsorbent and soften said resin.

26. The method of fabricating a pressed adsorbent form as set forth in claim 1 wherein said powdered adsorbent is of a size of between about 50 microns and 1,000 microns, and wherein said powdered resin is of a size of between about 10 microns and 500 microns and wherein said blend is compressed at a pressure of between about 3,000 pounds per square inch and 50,000 pounds per square inch.

27. The method of fabricating a pressed adsorbent form as set forth in claim 26 wherein said powdered adsorbent is present by weight in an amount of between about 65% and 90%.

28. The method of fabricating a pressed adsorbent form as set forth in claim 27 wherein said self-sustaining form is subsequently heated to between about 110° C. and 170° C. to activate said adsorbent and soften said resin.

29. The method of fabricating a pressed adsorbent form as set forth in claim 27 wherein said self-sustaining form is subsequently heated to between about 130° C. and 150° C. to activate said adsorbent and soften said resin.

30. The method of fabricating a pressed adsorbent form as set forth in claim 1 wherein said powdered adsorbent is of a size of between about 100 microns and 500 microns, and wherein said powdered resin is of a size of between about 20 microns and 100 microns and wherein said said blend is compressed at a pressure of between about 3,000 pounds per square inch and 50,000 pounds per square inch.

31. The method of fabricating a pressed adsorbent form as set forth in claim 30 wherein said powdered adsorbent is present by weight in an amount of between about 65% and 90%.

32. The method of fabricating a pressed adsorbent form as set forth in claim 31 wherein said self-sustaining form is subsequently heated to between about 110° C. and 170° C. to activate said adsorbent and soften said resin.

33. The method of fabricating a pressed adsorbent form as set forth in claim 31 wherein said self-sustaining form is subsequently heated to between about 130° C. and 150° C. to activate said adsorbent and soften said resin.

* * * * *